(12) United States Patent
Lavallee et al.

(10) Patent No.: US 7,953,905 B1
(45) Date of Patent: May 31, 2011

(54) METHODS AND APPARATUS FOR MODELING A STORAGE AREA NETWORK

(75) Inventors: James E. Lavallee, Boylston, MA (US); Kenneth E. Fickie, Ashland, MA (US); Rajesh Nandyalam, Whitinsville, MA (US); Alexander Dubrovsky, Westborough, MA (US); Steven Tanaka, Shrewsbury, MA (US); Denis Kennelly, Rochestown (IE)

(73) Assignee: EMC Corporation, Hopkinton, MA (US)

(*) Notice: Subject to any disclaimer, the term of this patent is extended or adjusted under 35 U.S.C. 154(b) by 166 days.

(21) Appl. No.: 11/396,280

(22) Filed: Mar. 31, 2006

(51) Int. Cl.
*G06F 3/00* (2006.01)
*G06F 5/00* (2006.01)
(52) U.S. Cl. .................... 710/38; 710/316; 370/351
(58) Field of Classification Search ............ 710/38
See application file for complete search history.

(56) References Cited

U.S. PATENT DOCUMENTS

| 7,401,338 B1* | 7/2008 | Bowen et al. ............... 719/328 |
| 7,558,274 B1* | 7/2009 | Kinsky et al. ............ 370/395.54 |
| 2006/0041656 A1* | 2/2006 | Li et al. .................... 709/223 |
| 2006/0106819 A1* | 5/2006 | Dhanadevan et al. ........ 707/100 |
| 2006/0173664 A1* | 8/2006 | Krishnamoorthy et al. .... 703/13 |
| 2006/0215564 A1* | 9/2006 | Breitgand et al. ........... 370/241 |

* cited by examiner

Primary Examiner — Henry W Tsai
Assistant Examiner — Elias Mamo
(74) Attorney, Agent, or Firm — Krishnendu Gupta; Gerald P. Kazanjian (57) ABSTRACT

Configurations herein present a multi-segment perspective of the SAN that models the SAN as an interconnection of protocol independent segments, each operable according to a particular transport mechanism and connected to other segments by an intersegment device such as a network bridge. Each segment is operable to include a fabric of manageable entities, such as storage arrays, switches, and hosts, that operate according to particular protocols and transport mechanisms employed by the fabric. Groups of manageable entities operable according to a particular protocol or transport mechanism are enumerated as a separate segment, and managed as a separate entity from the management application. The intersegment connections occur via an inter segment device operable to perform the mapping or translation from the respective address space of the segments. Therefore, a path from an initiator to a receiver manageable entity may be enumerated and managed by the management application as a multi-segment connection.

19 Claims, 7 Drawing Sheets

METHODS AND APPARATUS FOR MODELING A STORAGE AREA NETWORK

BACKGROUND

A storage area network provides information storage and retrieval services to a user community. Typically, storage area networks (SANs) include substantial quantities of mass storage, and may be distributed over a large geographic area. The storage area network includes a plurality of computing nodes, or manageable entities, interconnected and optimized to provide data storage and retrieval operations to the user community. The manageable entities include storage entities, typically storage arrays, connectivity devices such as routers and switches, and hosts, such as server computers operable for providing and managing data throughput between the users and storage entities in the SAN. The manageable entities are interconnected in a network fabric providing the physical transport paths between the manageable entities (SAN nodes).

A typical SAN includes a management application for monitoring and managing the manageable entities in the SAN. The manageable entities are responsive to the management application, and receive and respond to management requests from the management application. The management application executes on a server coupled to the storage area network, and connects to an operator console having a graphical user interface (GUI) for providing SAN status to an operator and for receiving the management requests from the operator. The SAN is therefore an interconnection of manageable entities responsive to a management application and operative to provide mass data storage and retrieval services to a user community. In a large SAN, the number of manageable entities may be substantial.

SUMMARY

In a conventional storage area network, a SAN management application monitors and manages manageable entities in the SAN. The manageable entities include storage arrays, connectivity devices, and hosts. The manageable entities are responsive to the management application for reporting various status metrics, and receiving control requests. A management server executes the SAN management application. The management server also connects to a console having a graphical user interface (GUI) for receiving and displaying operator parameters with a SAN operator.

The SAN operator, through exchanges between the management application and the various SAN nodes, monitors and manages the manageable entities. Typically, during normal operation, a SAN operator needs only a high level, or "birds eye" view of the SAN. Upon occurrence of an exception, error or abnormality, however, the SAN operator is alerted, and employs the management application to identify affected manageable entities and "drill down" to isolate and extract parameters and information from the affected manageable entities. In a homogeneous configuration employing a common vendor, protocol, and transport mechanism on a SAN, the manageable entities define a homogeneous fabric of physical connections between the manageable entities, which the conventional management application readily discovers, models (by populating a managed object database), and manages.

In typical modern SAN installations, however, there is a trend toward larger interconnections of manageable entities supporting larger storage demands. Modern users of storage area networks, therefore, increasingly employ larger interconnections of manageable entities. The traditional view of a SAN as encompassing a single local fabric such as a so-called "disk farm" has evolved into a larger SAN encompassing a distributed, multi-vendor, multi protocol interconnection of manageable entities. Each such physical interconnection is a fabric comprising a segment. Large users such as multinational corporations, financial institutions, and academic organizations with satellite campuses often employ individual fabric interconnections (each of which may qualify as a SAN itself) at distributed geographic locations, and also desire to monitor and manage the disperse aggregation of SANs as a single storage area network. Further, corporate acquisitions may result in a need to integrate a new SAN into an existing enterprise, which may not be of the same vendor or platform.

In such a diverse and/or distributed network, each of the respective groups of manageable entities sharing a physical interconnection under a particular protocol or transport mechanism defines a fabric of interconnected manageable entities. Each fabric is viewed as a segment by the management application. Connections in the SAN and the paths they define (i.e. an aggregation of connections between manageable entities, typically between a host to a storage array) may be monitored and managed as spanning a number of segments across the SAN.

For example, a particular fabric or segment may employ a Fiber Channel (FC) based transport mechanism, and connect via a bridge to another collection of manageable entities employing the well-known IP (Internet Protocol) medium as a transport mechanism that defines another segment. Or an FC based SAN may be operated by a corporation that acquires another organization running an ISCSI (Internet Small Computer Systems Interface) based SAN, for example. Other types of segments may be discovered and employed, such as Logical SANs (LSANs) and Virtual SANs, discussed further below. In the exemplary configuration, each such fabric defining a physical interconnection employing a particular transport mechanism or protocol defines a segment.

Unfortunately, conventional SANs suffer from the deficiency that heterogeneous collections of manageable entities may be difficult to discover, model and manage. A conventional SAN operator may find it cumbersome to attempt to monitor, isolate and drill down into a particular problem or event area in a large SAN having many types of transport mechanisms and/or protocols operable on the various manageable entities. The distinction of different segments may become less apparent among a large collection of storage arrays, switches and hosts, making the SAN cumbersome to manage.

Therefore, configurations herein are based, in part on the observation that the modern trend toward enterprise-wide SANs growing beyond the scope of a single segment, resulting in geographically diverse heterogeneous SANs having multi vendor arrangements of manageable entities running respectively different protocols, can result in a large unwieldy set of manageable entities when modeled as a conventional fabric of homogeneous storage arrays connected to hosts. It would be beneficial to have the ability to deploy manageable entities corresponding to different independent transport mechanisms, discover distinct segments of the storage area network demarcated by the fabrics defined by the transport mechanisms, and manage the different segments from a single instantiation of the management application, therefore allowing the ability to drill down into a particular segment and isolate individual manageable entities when appropriate.

Accordingly, configurations herein substantially overcome the shortcomings of conventional SAN modeling techniques by providing a multi-segment perspective of the SAN that models the SAN as an interconnection of protocol independent segments, each operable according to a particular transport mechanism and connected to other segments by an intersegment device such as a network bridge or multiprotocol router. Each segment is operable to include a fabric of manageable entities, such as storage arrays, switches, and hosts, that operate according to particular protocols and transport mechanisms employed by the fabric. Connections to manageable entities that are operable according to another protocol, transport mechanism, or via an interprotocol device are enumerated as a connection to another segment (intersegment connection). In this manner, groups of manageable entities operable according to a particular protocol or transport mechanism are enumerated as a separate segment, and managed as a separate entity from the management application. The intersegment connections occur via an intersegment device operable to perform the mapping or translation from the respective address space of a particular segments to the other connected segments. Therefore, a complete communication path from an initiator manageable entity to a receiver manageable entity may be enumerated and managed by the management application as a connection traversing multiple segments.

In further detail, the method of identifying I/O paths in a multi-segment storage area network (SAN) as discussed herein includes identifying a set of interconnected manageable entities having a common transport mechanism, and identifying a fabric of connections between the identified set of interconnected manageable entities, the fabric of connections defining a segment of manageable entities. The SAN management application determines a connection to at least one other manageable entity, in which the other manageable entity is operable in an independent transport mechanism, and identifies a path operable to provide the connection, such that the path is operable for transport outside the identified set to the at least one other manageable entity. Accordingly, the exemplary SAN management application disclosed herein is operable to discover a path between manageable entities, in which the path traverses a plurality of segments, such that each of the segments includes at least one manageable entity operable for communication in the respective segment, and the path is independent of the transport mechanism of each respective segment.

In the exemplary configuration, the segments further include a plurality of segments, such that each segment includes a logical grouping of manageable entities defined by a particular transport mechanism, and each segment is operable to connect to an intersegment connection device operable according to the transport mechanism of each segment to which it connects.

The SAN management application, prior to managing the manageable entities in the segments, discovers the segments by traversing, in the identified fabrics, the connections in the SAN, and identifies manageable entities found during the traversal. The management application determines transport mechanisms used by each of the identified manageable entities, and computes groups of discovered manageable entities employing particular transport mechanisms. The management application enters the computed groups as segments in a model (managed object database) depicting the environment, such that the computed groups are identifiable as segments by the management application for monitoring and manipulating manageable entities in the environment.

The exemplary SAN management application, therefore, deploys a plurality of segments, in which each segment includes a plurality of interconnected manageable entities, such that the interconnection defines a fabric of manageable entities responsive to a SAN management application, in which the fabric is further operable to connect to other segments via an intersegment device. The management application identifies, from the SAN management application, each of the deployed segments, in which the segments are demarcated by the intersegment device, such that the intersegment device is conversant with at least one manageable entity in each segment it connects to. The management application, via an operator GUI, manages each of the deployed segments from the SAN management application, in which the SAN management application is operable to issue commands to manageable entities in each identified segment and further operable to receive feedback from the manageable entities.

The SAN management application, therefore, models or discovers the SAN by identifying a plurality of sets of manageable entities as a grouping, such that the groupings each have a corresponding transport mechanism and at least one connection to another grouping. The management application also identifies an intersegment connection device connected to a plurality of groupings, such that the intersegment connection device is conversant in the transport mechanism of each grouping to which it connects. The managed object database then enumerates each of the groupings as a segment delimited by at least one intersegment connection device, such that the enumerated segments are responsive to the SAN management application.

By way of example, the management application performs multi-segment path discovery by identifying a first manageable entity in a first segment, such that the first manageable entity is operable according to a first protocol, and identifying a second manageable entity in a second segment, in which the second manageable entity is operable according to a second protocol. The management application computes a path between the first and second manageable entities, in which the path includes an intersegment device conversant in both the first protocol and the second protocol, and stores an entry (record or other representation) of the path in a database of interconnections between manageable entities, such that the path entry is adapted to include manageable entities operable to a plurality of protocols In the exemplary configuration, the management application discovers the intersegment device, in which the intersegment device is a segment gateway operable to provide address translation between the address space of the interconnected segments, such that the segment gateway is operable according to a protocol of each of the segments it interconnects.

The multi-segment storage area network configured as disclosed herein, therefore, interfaces to a management application operable to drill down into at least one segment. The management application allows an operator to select a segment, such that the segment including a fabric of manageable entities, in which the fabric further defines a physical interconnection of manageable entities, each of the manageable entities responsive to the management application, and manage the manageable entities in the segment. In the exemplary arrangement, the segment includes at least one ingress point and at least one egress point, in which a path defines a link between an initiator and a target traversing an ingress point and egress point at each segment traversed. Discovery of the segment further includes identifying at least one of the ingress point and the egress point in the discovered segment. In a typical configuration, the identified path is from a host to a storage device in a storage array, such that managing may further include determining zoning between identified manageable entities. Such zoning includes computing, for a particular manageable entity, a set of storage arrays accessible from the identified manageable entity. Further, managing the multi-segment SAN may further comprise determining LUN masking between the identified manageable entities, in which the LUN masking is operable to logically group storage arrays.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein present a multi-segment perspective of a storage area network (SAN) that models the SAN as an interconnection of protocol independent segments, each operable according to a particular transport mechanism and connected to other segments by an intersegment device such as a network bridge. Each segment is operable to include a fabric of manageable entities, such as storage arrays, switches, and hosts, that operate according to particular protocols and transport mechanisms employed by the fabric. Connections to manageable entities that are operable according to another protocol, transport mechanism, or via an inter-protocol device are enumerated as a connection to another segment (intersegment connection). In this manner, groups of manageable entities operable according to a particular protocol or transport mechanism are enumerated as a separate segment, and managed as a separate entity from the management application. The intersegment connections occur via an inter segment device operable to perform the mapping or translation from the respective address space of one segment to another. Therefore, a complete communication path from an initiator manageable entity to a receiver manageable entity may be enumerated and managed by the management application as a connection traversing multiple segments.

Figure 1:
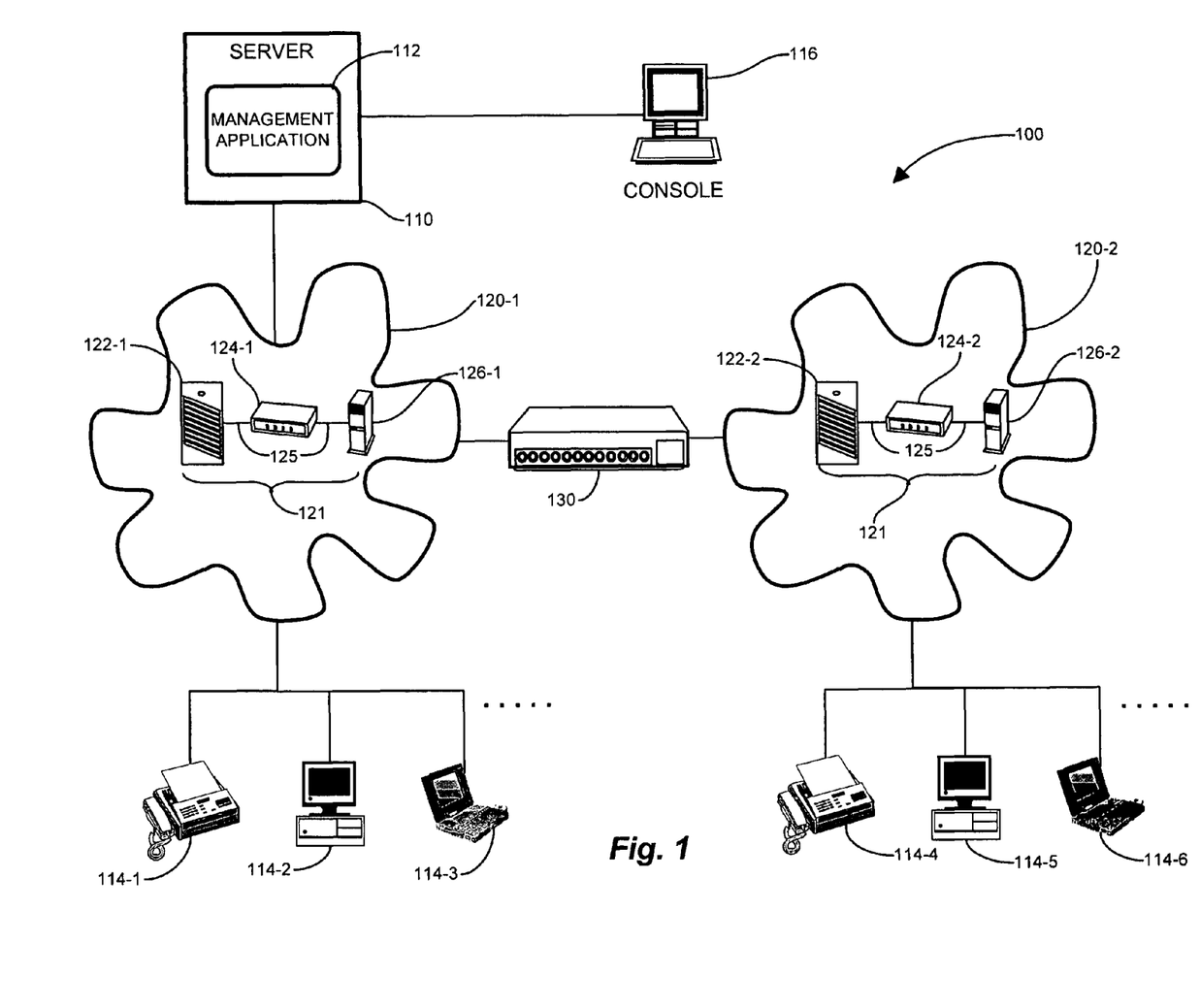
FIG. 1 is a context diagram of an exemplary managed information environment suitable for use with the present invention.

FIG. 1 is a context diagram of an exemplary managed information environment suitable for use with the present invention. Referring to FIG. 1, a managed information environment 100 includes a plurality of segments 120-1 ... 120-2 (120 generally), each including a plurality of SAN nodes, such as manageable entities 121. In the exemplary configuration, the SAN nodes include storage entities, such as storage arrays 122-1 ... 122-2 (122 generally), connectivity devices such as switches 124-1 ... 124-2 (124 generally), and host computers, or hosts 124-1 ... 124-2 (124 generally). Other types of manageable entities may be included in alternate configurations. The manageable entities 121 in a segment 120 are coupled via physical interconnections defining a fabric 125. Further, a manageable entity 121 often has other included manageable entities, discussed further below. For example, a storage array 122 includes a number of storage devices (i.e. disk drives, not specifically shown), which are also manageable entities 121. The segments 120, as will be discussed further below, have a particular type based on an underlying protocol or transport mechanism supporting the manageable entities 121 in the segment. For example, the segments may employ various mediums, including fiber channel (FC), Internet Protocol (IP), Internet Small Computer Systems Interface (ISCSI), Logical SAN (LSAN), and Virtual SAN (VSAN), to name several. An intersegment device 130, such as a bridge, connects multiple segments 120, and is conversant in the protocol or transport medium operable in each segment 120 connected to it.

The storage area network 100 provides information storage and retrieval services to a user community via user devices 114-1 ... 114-6 (114 generally). The user devices 114 connect to one of the segments 120 in the SAN. Specifically, the user devices 114 connect to a particular manageable entity in the segment 120, typically a host 126. A server 110 also connects to one or more segments 120 in the SAN environment 100, and executes a management application 112, to which the manageable entities 121 are responsive. The server 110 also connects to an operator console 116, operable by a SAN operator (not specifically shown), for performing monitoring and managing the SAN through various administrative functions and operations available from the management application 112. In this manner, the intersegment device 130 provides intersegment visibility and management capability to the manageable entities 121 accessible via the bridge 130. Through discovery of the intersegment device 130 and the segments 120 and manageable entities 121 accessible thereby, the management application 112 enumerates the segments 120 as a distinct portion of the SAN 100 and identifies manageable entities 121 therein accordingly.

Figure 2:
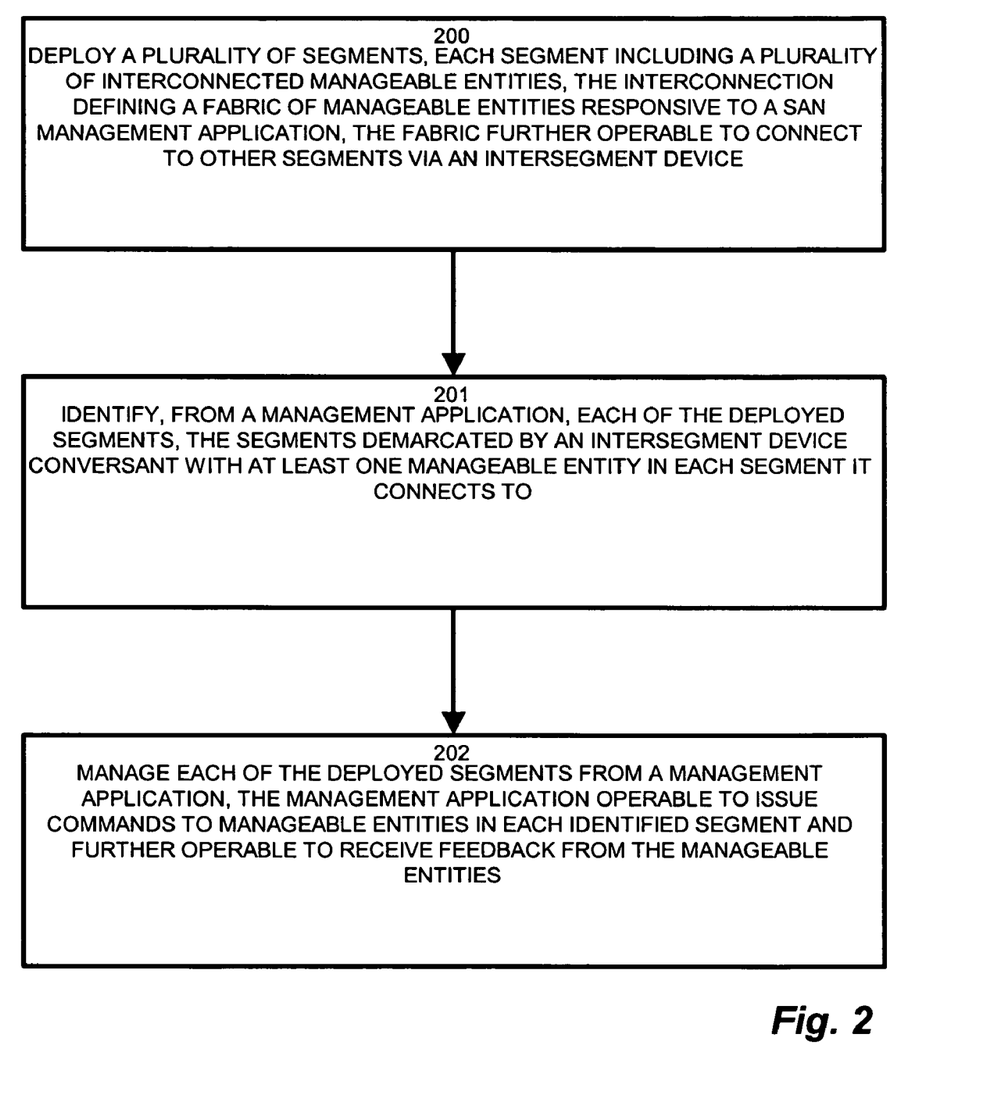
FIG. 2 is a flowchart of segment deployment, discovery and management in the environment of FIG. 1.

FIG. 2 is a flowchart of segment 120 deployment, discovery and management in the environment of FIG. 1. Referring to FIGS. 1 and 2, the method of managing a SAN as disclosed herein includes, at step 200, deploying a plurality of segments 120, in which each segment 120 includes a plurality of interconnected manageable entities 121, such that the interconnection defines a fabric 125 of manageable entities 121 responsive to the SAN management application 112, and in which the fabric 125 is further operable to connect to other segments 120 via an intersegment device 130.

During startup or a configuration change, the management application 112 identifies each of the deployed segments 120, in which the segments 120 are demarcated by an intersegment device 130 conversant with one or more manageable entities 121 in each segment 120 it connects to, as depicted at step 201. The server 110, responsive to the operator console 116, manages each of the deployed segments 120 from the management application 112, such that the management application 112 is operable to issue commands to manageable entities 121 in each identified segment 120 and is further operable to receive feedback from the manageable entities 121, as depicted at step 202. The console 116 provides operator control via a graphical user interface (GUI) or other suitable means responsive to the SAN operator.

In this manner, a SAN operator performs deployment, discovery, and management of multiple segments 120 in the storage area network 100, in which the segments 120 define a path-centric approach to multi-segmented SANs. Many management and administrative functions performed by the management application 112 focus on the path between an initiator and a receiver, such as a host 126 and a storage array 122. Accordingly, the method disclosed herein allows the management application 112 to model a path between manageable entities 121 across segments 120, and identify each segment 120 accordingly.

Figure 3:
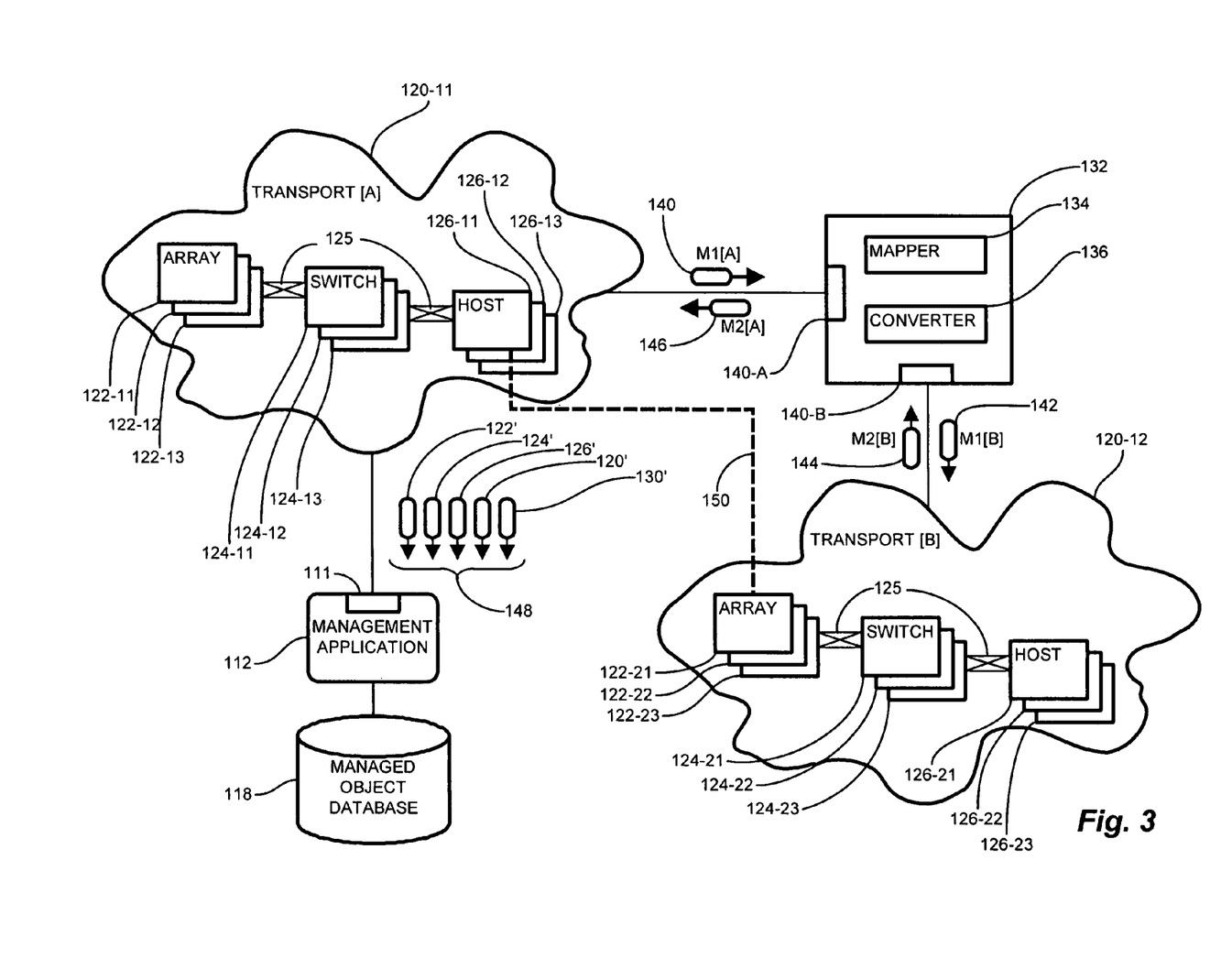
FIG. 3 is a block diagram of segment operation and management according to the flowchart in FIG. 2.
Figure 4:
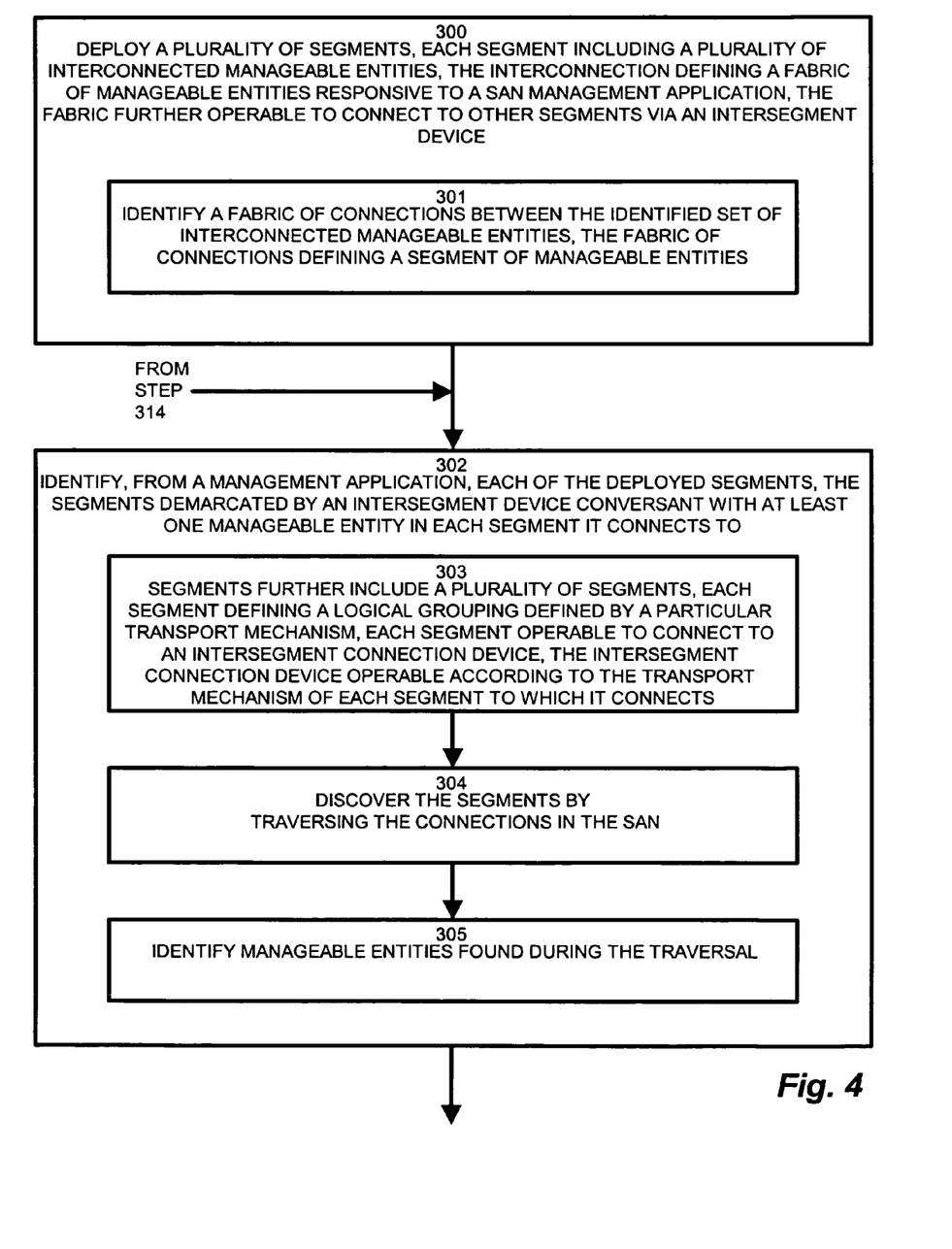
FIGS. 4-7 are a flowchart of multi-segment SAN management in the environment depicted in FIG. 3.
Figure 5:
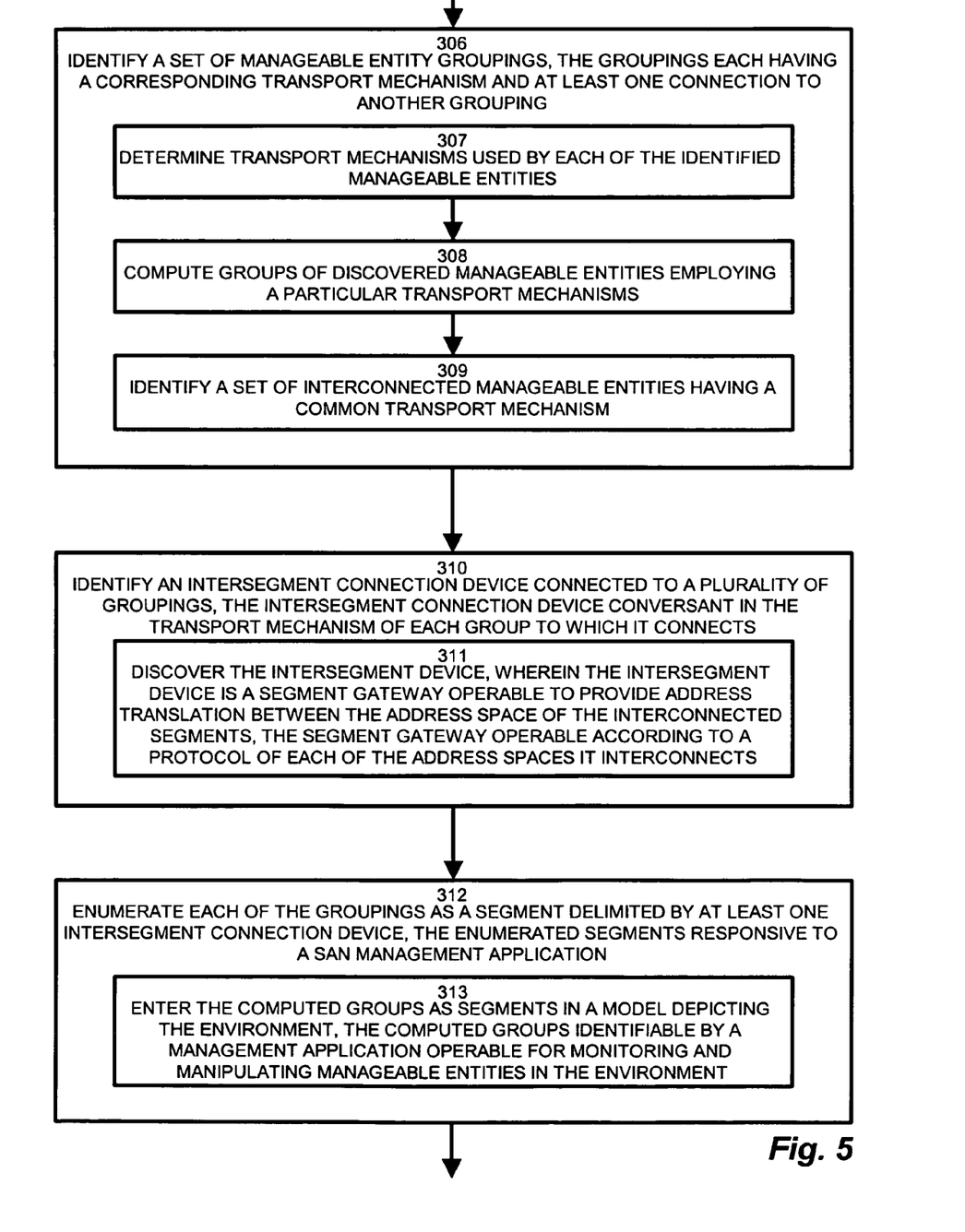
Figure 6:
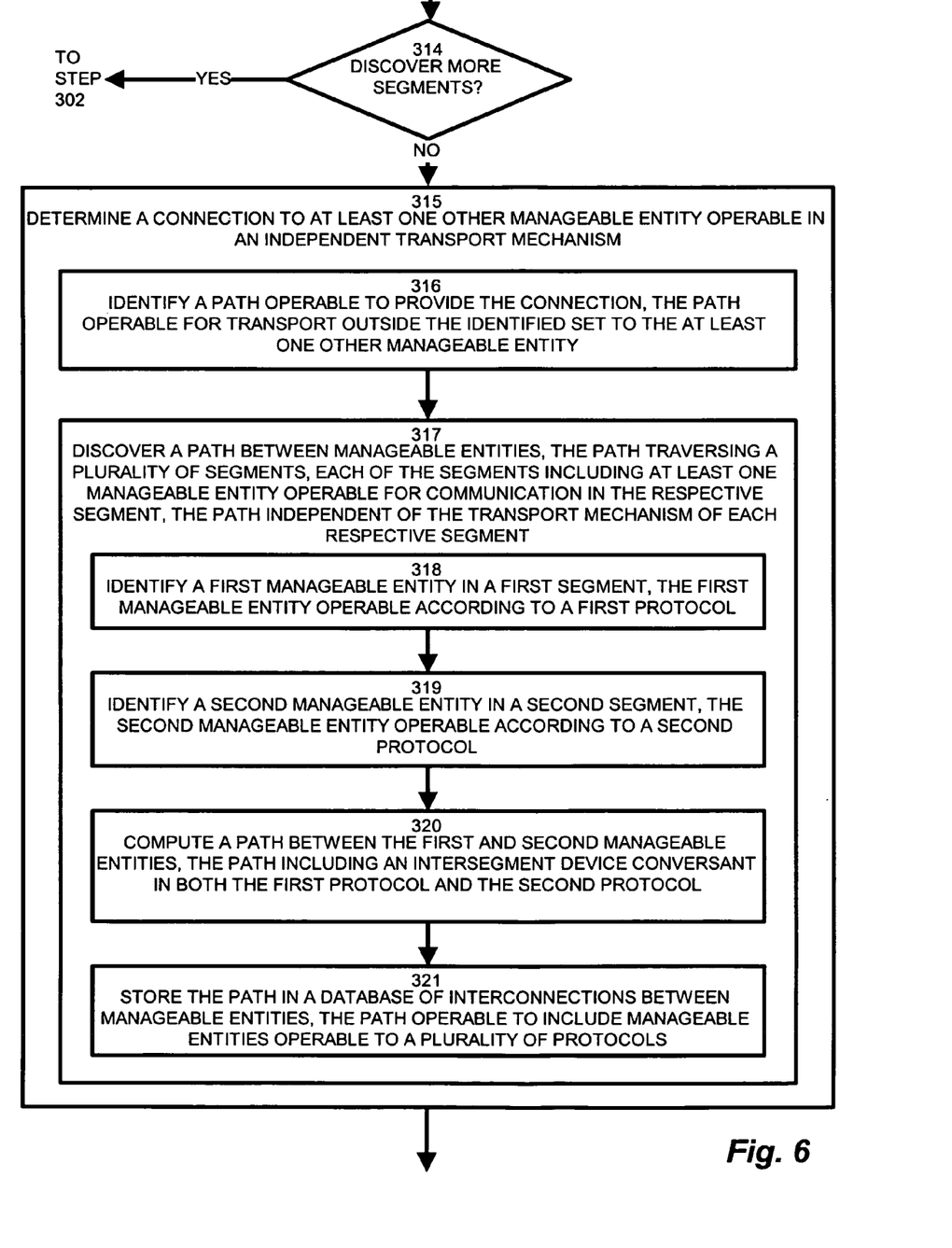
Figure 7:
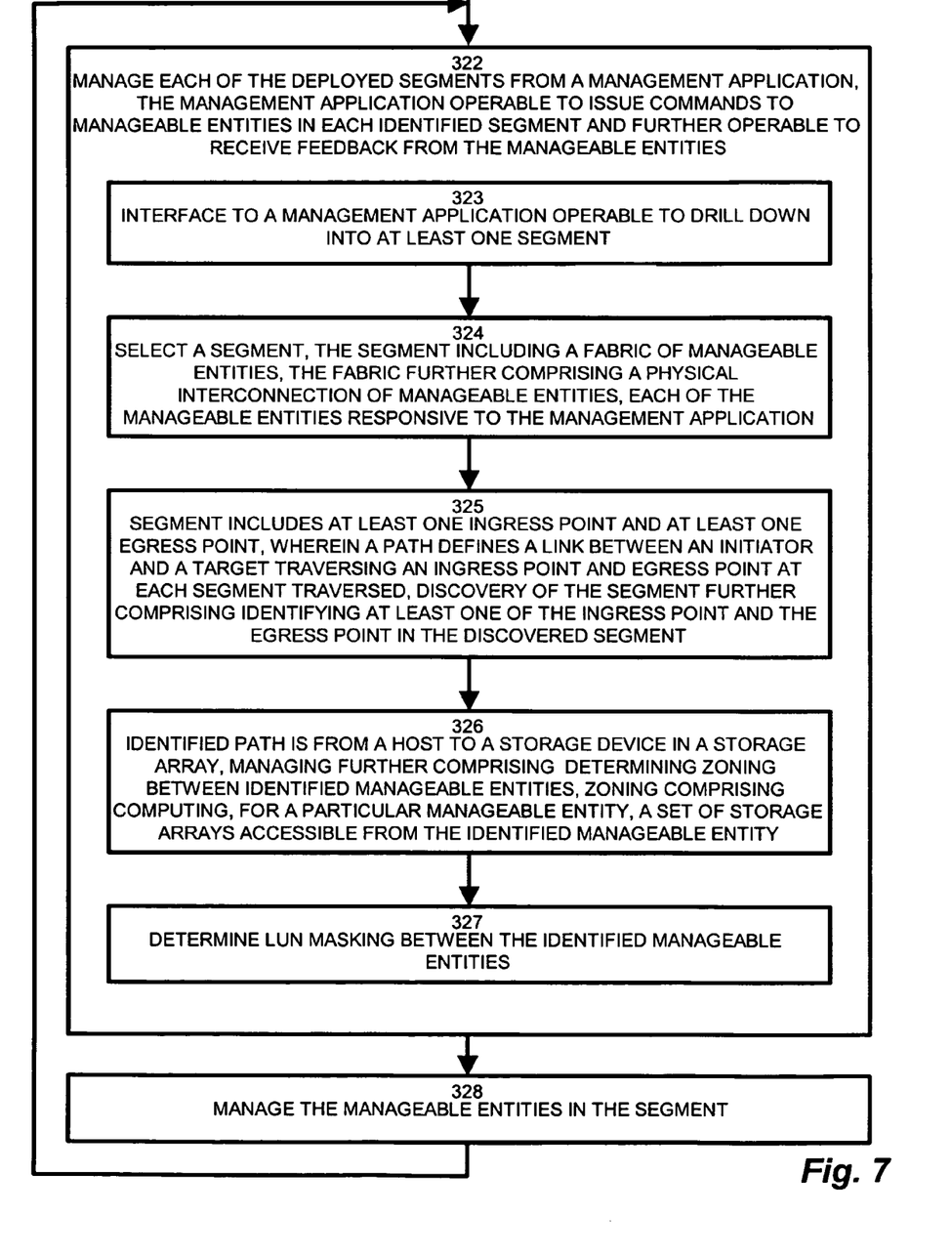

FIG. 3 is a block diagram of segment operation and management according to the flowchart in FIG. 2. Referring to FIGS. 1-3, exemplary segments 120-11 and 120-12 are connected via a bridge 132, which operates as an intersegment device 130 between segment 120-11, employing transport medium A, and segment 120-12, employing transport medium B. The management application 112 has an interface 111 to the segments 120 and is in communication with segment 120-11, and segment 120-12 is responsive to the management application 112 via the bridge 132, as will now be discussed further. The segment 120-11 operable according to transport A includes arrays, switches and hosts 122-11 . . . 122-13, 124-11 . . . 124-13 and 126-11 . . . 126-13, respectively. Additional manageable entities 121 may be included as the configuration dictates. Segment 120-12, conversant in transport B, likewise includes arrays, switches and hosts 122-21 . . . 122-23, 124-21 . . . 124-23 and 126-21 . . . 126-23, respectively. As indicated above, the respective transport mechanisms may include FC, IP, ISCSI, VSAN and LSAN. A VSAN based segment, for example, allows a virtual SAN representable by software on a single computer system and represent a plurality of manageable entities as distinct virtual entities (i.e. SAN nodes). Such a configuration is available commercially via VMWare® LSAN implementations, from EMC Corporation of Hopkinton, Mass., assignee of the present application. Further, segment representations may be LSAN implementations, available commercially from Brocade® Communications Systems Inc, of San Jose, Calif. These and other virtualization mechanisms provide various implementations of segments 120 operable according to configurations herein.

The bridge 132 is conversant in both transport A and transport B mediums, and includes an A interface 140-A to segment 120-11, and a B interface 140-B to segment 120-12. The bridge 132 also includes a mapper 134 and a protocol converter 136. The exact operational details of the bridge 132 are dependent on the particular segments 120 and transport mechanisms or protocols employed, but are summarized as follows. The mapper 134 is operable to translate between the address space of the respective segments 120-11 and 120-12. In other words, is operable to map an address according to transport mechanism A to an address according to transport mechanism B and vice versa. The protocol converter 136 is operable to perform field and bit level manipulations of messages sent between the segments 120 so as to translate from an initiator (origination) format to a receiver (destination) format. Such conversion may include tunneling, decoding and encoding, and encryption and authentication for example, depending on the protocols employed by the respective A and B transport mechanisms.

For example, a message M1[A] (140) is transmitted from segment 120-11 by host 126-11 according to transport A. The bridge 132 receives the message 140, and employs the mapper 134 to identify the recipient as a manageable entity 122-21 in segment 120-12. The bridge 132 also invokes the protocol converter 136 to reformat and encode the message according to transport mechanism B, and generates message M1 [B] (142) operable to be received by a manageable entity in segment 120-12. Similarly, a second message M2[B] (144) is sent from segment 120-12, and the bridge 132 regenerates message M2[A] (146) for receipt by segment 120-11. In this manner, the intersegment device 130 (bridge 132 in the present example) performs intersegment communication for enabling segment based monitoring and control from the management application 112.

Accordingly, during startup or reconfiguration, the management application 112 receives discovery information 148 pertaining to the visible segments 120, such as discovery messages of storage arrays 122', connectivity devices 124', hosts 126', segments 120' and intersegment devices 130', and is operable to perform monitoring of the various manageable entities 121, including the segments 120 and intersegment devices 130. A managed object database (MODB) 118 is responsive to the management application 112 for storing the configuration and related statistics of the manageable entities 121.

FIGS. 4-7 are a flowchart of multi-segment SAN management in the environment depicted in FIG. 3. Referring to FIGS. 3-7, the method of managing a multi-segment SAN as disclosed herein includes, as step 300, deploying a plurality of segments 120, such that each segment 120 includes a plurality of interconnected manageable entities 121, in which the interconnection defines a fabric 125 of manageable entities 120 responsive to a SAN management application 112, and in which the fabric 125 is further operable to connect to other segments 120 via an intersegment device 130. The deployed segments 120 are a result of SAN configuration, and may be responsive to SAN upgrades, such as the addition or replacement of SAN nodes. The management application 112 identifies a fabric 125 of connections between the identified set of interconnected manageable entities 120, the fabric 125 of connections therefore defining a segment 120 of manageable entities 121, as shown at step 301.

A discovery operation, typically initiated upon a configuration change or system startup, identifies, from the management application 112, each of the deployed segments 120, such that the segments 120 are demarcated by an intersegment device 130 conversant with at least one manageable entity 121 in each segment 120 it connects to, as depicted at step 302. In the disclosed multi-segment SAN, the segments 120 further include a plurality of segments 120, such that each segment 120 includes a logical grouping defined by a particular transport mechanism, as shown at step 303. Each segment 120 is operable to connect to an intersegment connection device 130, in which the intersegment connection device 130 is operable according to the transport mechanism of each segment 120 to which it connects. Generally, therefore, the segments 120 are bounded by the collection of manageable entities 121 conversant according to a particular protocol or transport mechanism. The intersegment device 130, conversant in at least 2 protocols (the segments it connects between), typically connects to a particular manageable entity 121, in each segment 120, thus denoting an entry point or edge device for the segment 120. Further, it should be noted that adjacent segments 120 may also have similar protocols, and need not necessarily employ a different transport mechanism or protocol. The discovery operation discovers the segments 120 by traversing the connections in the SAN 100 (i.e. the fabric 125), as depicted at step 304, and identifies the manageable entities 121 found during the traversal, as disclosed at step 305.

Having discovered the manageable entities 121 in the SAN environment, the management application models the SAN, including identifying each set of manageable entity groupings, such that the groupings each having a corresponding transport mechanism and at least one connection to another grouping, as depicted at step 306. This includes, at step 307, determining transport mechanisms used by each of the identified manageable entities 121, and computing groups of discovered manageable entities 121 employing a particular transport mechanisms, as depicted at step 308. Manageable entities 121 sharing a common fabric 125, and thus operable under a common transport mechanism, constitute a set adapted to form a segment 120. Accordingly, the management application 112 identifies sets of interconnected manageable entities 121 having a common transport mechanism, as shown at step 309.

The management application 112 also identifies an intersegment connection device 130 connected to a plurality of groupings, in which the intersegment connection device 130 is conversant in the transport mechanism of each group to which it connects, as depicted at step 310. The management application 112, for each identified intersegment device connected to one or more of the identified groups, discovers the intersegment device 130, in which the intersegment device 130 is a segment gateway operable to provide address translation between the address space of the interconnected segments 120, as disclosed at step 311. The discovered segment gateway is therefore operable according to a protocol of each of the address spaces (i.e. segment) that it interconnects.

The management application 112 enumerates each of the groupings as a segment delimited by at least one intersegment connection device by storing the segments 120 and connected intersegment devices 130 in the managed object database 118, as shown at step 312. In the exemplary configuration employing the MODB 118, the management application enters the computed groups as segments 120 in a model depicting the environment 100, such that the computed groups are identifiable by the management application 112 operable for monitoring and manipulating manageable entities 121 in the environment 100, as shown at step 313. The enumerated segments 130 and included manageable entities 120 are then responsive to the SAN management application 112 via the MODB 118.

The discovery process continues to discover all visible segments and corresponding intersegment devices 130. Accordingly, a check is performed at step 314 to determine whether to discover more segments 120, and control reverts to step 302 accordingly. For each discovered segment 120, the management application 112 identifies intersegment paths 150 by determining a connection to one or more other manageable entities 120, in which the other manageable entity 120 is operable in an independent transport mechanism, as depicted at step 315. This includes, at step 316, identifying a path 150 operable to provide the connection, such that the path 150 is operable for transport outside the identified set to the at least one other manageable entity 120, as depicted at step 316. For multi-segment paths, the path enters and leaves traversed segments via manageable entities connected to the intersegment devices 130, and thus operable as ingress and egress points of the respective segments. Each path between manageable entities, therefore, includes an initiator node and a receiver node (manageable entities), and traverses the segments 120 in the path through at least the ingress and egress points of each segment 120 traversed.

Therefore, discovery further includes discovering a path 150 between manageable entities 120, such that the path traverses a plurality of segments, and in which each of the segments include at least one manageable entity operable for communication in the respective segment, as depicted at step 317. Since the path traverses multiple segments, the path is independent of the transport mechanism of each respective segment 120 through which it passes. An intersegment path 150 from an initiator manageable entity, say 126-11 (host), for example, to a receiver manageable entity 122-21 (storage array), defines a logical path 150 independent from a physical path that traverses the fabric of each respective segment 120-11, 120-12, in the example shown.

In further detail, path discovery may include identifying a first manageable entity 126-11 in a first segment 120-11, such that the first manageable entity 126-11 is operable according to a first protocol [A], as depicted at step 318. The management application identifies a second manageable entity 122-21 in a second segment 120-12, in which the second manageable entity is operable according to a second protocol [B], as disclosed at step 319. The management application 112 computes a path 150 between the first and second manageable entities 126-11, 122-21, such that path 150 includes an intersegment device 130 conversant in both the first protocol [A] and the second protocol [B], as depicted at step 320. The management application 112 then stores the path 150 in a database of interconnections (MODB) 118 between manageable entities 121, in which the path 150 is operable to include manageable entities operable to a plurality of protocols [A], [B], as shown at step 321. The path 150 is therefore representable as a logical entity 150, and the database entry is operable to include the physical path representations through the respective fabrics of segments 120-11 and 120-21 via the bridge 132 (intersegment device).

The managed object database 118 may include entries for segments 120 and paths 150 (intersegment connections), in addition to entries for each of the types of manageable entities 121, generated from information in the multi-segment discovery messages 148. Accordingly, a SAN operator may manage each of the deployed segments 120 from the management application 112, such that the management application 112 is operable to issue commands as messages 140, 142 to the manageable entities 121 in each identified segment 120 and is further operable to receive feedback as messages 144, 146 from the manageable entities 121, as depicted at step 322.

In the resulting multi-segment SAN provided in the environment 100, the various segments 120 interface to the management application 112 operable to drill down into the segments 120, as depicted at step 323. The management application 112, via an operator GUI in the console 116, selects a segment 120, such that the segment 120 includes a fabric 125 of manageable entities 120, in which fabric 125 further includes a physical interconnection of manageable entities 121, and in which each of the manageable entities 121 is responsive to the management application 112, as disclosed at step 324. In the exemplary multi-segment configuration discussed, each segment 120 includes at least one ingress point and at least one egress point, in which a path 150 defines a link between an initiator 126-11 and a target 122-21 traversing an ingress point and egress point at each segment 120 traversed, as disclosed at step 325 and discussed above. Discovery of the segment 120 therefore further includes identifying at least one of an ingress point and an egress point in the discovered segment 120. In the exemplary configuration shown, the identified path 150 is from a host 126-11 to a storage device in a storage array 122-21, such that managing may further include determining zoning between identified manageable entities, zoning including computing, for a particular manageable entity, a set of storage arrays accessible from the identified manageable entity, as depicted at step 326. Managing may further include determining LUN masking between the identified manageable entities 121, as depicted at step 327. Such LUN masking is operable to logically group storage arrays, as is known to those of skill in the art. The management application 112 continues managing the manageable entities 121 in the segment 120, and control reverts to step 322, employing the multi-segment model captured (discovered) in the MODB 118 as discussed above, as depicted at step 328.

Those skilled in the art should readily appreciate that the programs and methods for modeling and managing a storage area network as defined herein are deliverable to a processing device in many forms, including but not limited to a) information permanently stored on non-writeable storage media such as ROM devices, or b) information alterably stored on writeable storage media such as floppy disks, magnetic tapes, CDs, RAM devices, and other magnetic and optical media. Alternatively, the operations and methods disclosed herein may be embodied in whole or in part using hardware components, such as Application Specific Integrated Circuits (ASICs), Field Programmable-Gate Arrays (FPGAs), state machines, controllers or other hardware components or devices, or a combination of hardware, software, and firmware components.

While the system and method for modeling and managing a storage area network has been particularly shown and described with references to embodiments thereof, it will be understood by those skilled in the art that various changes in form and details may be made therein without departing from the scope of the invention encompassed by the appended claims.

What is claimed is:

1. A method of identifying I/O paths in a storage area network (SAN) comprising:
   identifying a fabric of connections between a set of interconnected manageable SAN entities, the fabric of connections comprising a first network segment and a second network segment, the first network segment comprising a logical grouping of manageable SAN entities and operating according to a first transport mechanism, the second network segment comprising a logical grouping of manageable SAN entities and operating according to a second transport mechanism, the first transport mechanism different than the second transport mechanism,
   wherein (i) at least one of the manageable SAN entities in the first network segment and (ii) at least one of the manageable SAN entities in the second network segment each connects to an intersegment connection device, the intersegment connection device performing intersegment communications between the respective manageable SAN entities within the first network segment and the second network segment;
   identifying at least one intersegment path between the first network segment and the second network segment, wherein each manageable SAN entity from the respective first and second network segments, that is connected to the intersegment connection device, comprises an ingress and egress point for its corresponding network segment; and
   mapping a SAN message along the identified intersegment path, wherein mapping the SAN message includes discovering respective manageable SAN entities in the first network segment and the second network segment wherein discovering manageable SAN entities include:
      traversing through the first network segment and the second network segment via the intersegment connection device;
      identifying manageable SAN entities found during the traversal;
      determining a respective transport mechanism used by each of the identified manageable SAN entities;
      computing groups of discovered manageable SAN entities employing particular transport mechanisms; and
      entering the computed groups as respective network segments in a model depicting a SAN environment, the SAN environment modeled via a SAN management application, the SAN management application operable for concurrently monitoring and accessing a first manageable SAN entity in the first network segment and a second manageable SAN entity in the second network segment;
   wherein discovering manageable SAN entities occurs upon detecting a configuration change occurring within the SAN;
   wherein monitoring and accessing the first manageable SAN entity in the first network segment and a second manageable SAN entity in the second network segment includes:
   via the SAN management application:
      instantiating a third manageable SAN entity in the first network segment;
      establishing a connection between the third manageable SAN entity and the first manageable SAN entity in the first network segment; and
      executing an upgrade to the second manageable SAN entity in the second network segment.

2. A method of managing a Storage Area Network (SAN), comprising:
   identifying a fabric of connections between a set of interconnected manageable SAN entities, the fabric of connections comprising a first network segment and a second network segment, the first network segment comprising a logical grouping of manageable SAN entities operating according to a first transport mechanism, the second network segment comprising a logical grouping of manageable SAN entities operating according to a second transport mechanism, the first transport mechanism different than the second transport mechanism,
   wherein (i) at least one of the manageable SAN entities in the first network segment and (ii) at least one of the manageable SAN entities in the second network segment each connects to an intersegment connection device, the intersegment connection device performing intersegment communications between the respective manageable SAN entities within the first network segment and the second network segment;

identifying at least one intersegment path between the first network segment and the second network segment, wherein each manageable SAN entity from the respective first and second network segments, that is connected to the intersegment connection device, comprises an ingress and egress point for its corresponding network segment; and mapping a SAN message along the identified intersegment path, wherein mapping the SAN message includes discovering respective manageable SAN entities in the first network segment and the second network segment; wherein discovering manageable SAN entities includes:
  traversing through the first network segment and the second network segment via the intersegment connection device;
  identifying manageable SAN entities found during the traversal;
  determining a respective transport mechanism used by each of the identified manageable SAN entities;
  computing groups of discovered manageable SAN entities employing particular transport mechanisms; and
  entering the computed groups as respective network segments in a model depicting a SAN environment, the SAN environment modeled via a SAN management application, the SAN management application operable for concurrently monitoring and accessing a first manageable SAN entity in the first network segment and a second manageable SAN entity in the second network segment;
wherein discovering manageable SAN entities occurs upon detecting a configuration change occurring within the SAN;
wherein monitoring and accessing the first manageable SAN entity in the first network segment and a second manageable SAN entity in the second network segment includes:
  via the SAN management application:
    instantiating a third manageable SAN entity in the first network segment;
    establishing a connection between the third manageable SAN entity and the first manageable SAN entity in the first network segment; and
  executing an upgrade to the second manageable SAN entity in the second network segment.

3. The method of claim 2 further comprising modeling the SAN, including:
  identifying a plurality of sets of manageable SAN entities as a grouping, the groups each having a corresponding transport mechanism and at least one connection to another grouping;
  identifying the intersegment connection device connected to a plurality of groupings, the intersegment connection device conversant in the transport mechanism of each grouping to which it connects, the intersegment connection device connected to at least one manageable SAN entity in a third network segment; and
  enumerating each of the groupings as a network segment delimited by the intersegment connection device, the enumerated network segments responsive to the SAN management application.

4. The method of claim 3 further comprising discovering the intersegment path between manageable SAN entities, the intersegment path traversing a plurality of network segments, each of the network segments including at least one manageable SAN entity operable for communication in the respective network segment, the intersegment path independent of the transport mechanism of each respective network segment.

5. The method of claim 2 further comprising discovering the intersegment connection device, wherein the intersegment connection device is a network segment gateway operable to provide address translation between the address spaces of the respective network segments, the network segment gateway operable according to a protocol of each of the respective network segment to which it provides access.

6. The method of claim 1 further comprising:
  interfacing to the SAN management application, which is operable to drill down into at least one network segment;
  selecting a network segment, the network segment including a fabric of manageable SAN entities, the fabric further comprising a physical interconnection of manageable SAN entities, each of the manageable SAN entities responsive to the management application; and
  managing the manageable SAN entities in the network segment.

7. The method of claim 6 wherein the network segment includes at least one ingress point and at least one egress point, wherein the intersegment path defines a link between an initiator and a target traversing an ingress point and egress point at each network segment traversed, discovery of the network segment further comprising identifying at least one of the ingress point and the egress point in the discovered network segment.

8. The method of claim 7 wherein the identified intersegment path originates from a host in the first network segment operating according to a first protocol to a storage device in a storage array operating according to a second protocol and situated in the second network segment; and
  determining zoning between identified manageable SAN entities, wherein zoning comprises computing, for a particular manageable SAN entity, a set of storage arrays situated in different network segment, accessible from the identified manageable SAN entity via a respective intersegment connection device.

9. The method of claim 7 further comprising determining LUN masking between the identified manageable SAN entities, LUN masking operable to logically group the storage arrays.

10. A SAN management device configured to identify I/O paths in a storage area network (SAN) comprising a SAN management application configured to:
  identify a fabric of connections between a set of interconnected manageable Storage Area Network (SAN) entities, the fabric of connections comprising a first network segment and a second network segment, the first network segment comprising a logical grouping of manageable SAN entities operating according to a first transport mechanism, the second network segment comprising a logical grouping of manageable SAN entities operating according to a second transport mechanism, the first transport mechanism different than the second transport mechanism,
  wherein (i) at least one of the manageable SAN entities in the first network segment and (ii) at least one of the manageable SAN entities in the second network segment each connects to an intersegment connection device, the intersegment connection device performing intersegment communications between the respective manageable SAN entities within the first network segment and the second network segment;
  identify at least one intersegment path between the first network segment and the second network segment, wherein each manageable SAN entity from the respective first and second network segments, that is connected to the intersegment connection device, comprises an ingress and egress point for its corresponding network segment; and map a SAN message along the identified intersegment path to discover respective manageable SAN entities in the first network segment and the second network segment, which further includes:

traverse through the first network segment and the second network segment via the intersegment connection device;

identify manageable SAN entities found during the traversal;

determine a respective transport mechanism used by each of the identified manageable SAN entities;

compute groups of discovered manageable SAN entities employing particular transport mechanisms; and enter the computed groups as respective network segments in a model depicting a SAN environment, the SAN environment modeled via a SAN management application, the SAN management application operable to concurrently monitor and access at least one manageable SAN entity in the first network segment and at least one manageable SAN entity in the second network segment;

wherein discovering manageable SAN entities occurs upon detecting a configuration change occurring within the SAN;

wherein the SAN management application is further operable to:

via the SAN management application:

as it monitors and accesses the first manageable SAN entity in the first network segment and second manageable SAN entity in the second network segment:

(i) instantiate a third manageable SAN entity in the first network segment;

(ii) establish a connection between the third manageable SAN entity and the first manageable SAN entity in the first network segment; and (iii) execute an upgrade to the second manageable SAN entity in the second network segment.

11. The SAN management device of claim 10 wherein the SAN management application is further operable to:

deploy a plurality of network segments, each network segment including a plurality of interconnected manageable SAN entities, the interconnection defining a fabric of manageable SAN entities responsive to the SAN management application, the fabric further operable to connect to other network segments via at least one respective intersegment connection device;

identify, from the SAN management application, each of the deployed network segments, the network segments demarcated by the intersegment connection device, the intersegment connection device conversant with at least one manageable SAN entity in each network segment it connects to; and manage each of the deployed network segments from the SAN management application, the SAN management application operable to issue commands to manageable SAN entities in each identified network segment and further operable to receive feedback from the manageable SAN entities.

12. The SAN management device of claim 11 wherein the SAN management application is further configured to:

identify as a grouping plurality of sets of manageable SAN entities, the groups each having a corresponding transport mechanism and at least one connection to another grouping via the intersegment connection device;

identify the intersegment connection device connected to a plurality of groupings, the intersegment connection device having a protocol converter conversant in the transport mechanism of each grouping to which it connects;

enumerate each of the groupings as a network segment delimited by at least one intersegment connection device, the enumerated network segments responsive to the SAN management application; and discover the intersegment path between manageable SAN entities, the path traversing a plurality of network segments, each of the network segments including at least one manageable SAN entity configured for communication in the respective network segment, the intersegment path identified despite differing transport mechanisms of each respective network segment.

13. The SAN management device of claim 12 wherein the intersegment connection device is a network segment gateway having a mapper operable to map at least one SAN message to identify at least one of the manageable SAN entities in a respective network segment as a manageable SAN entity and provide address translation between the address spaces of the interconnected network segments, the network segment gateway operable according to a protocol of each of the network segments it interconnects.

14. A computer program product comprising a non-transitory computer readable storage medium storing computer program logic embodied in computer program code encoded thereon that when executed by a computer cause the computer to perform a method for identifying I/O paths in a storage area network (SAN) comprising:

Computer program code for identifying a fabric of connections between a set of interconnected manageable SAN entities, the fabric of connections comprising a first network segment and a second network segment, the first network segment comprising a logical grouping of manageable SAN entities operating according to a first transport mechanism, the second network segment comprising a logical grouping of manageable SAN entities operating according to a second transport mechanism, the first transport mechanism different than the second transport mechanism, wherein (i) at least one of the manageable SAN entities in the first network segment and (ii) at least one of the manageable SAN entities in the second network segment each connects to an intersegment connection device, the intersegment connection device performing intersegment communications between the respective manageable SAN entities within the first network segment and the second network segment;

computer program code for identifying at least one intersegment path between the first network segment and the second network segment, wherein each manageable SAN entity from the respective first and second network segments, that is connected to the intersegment connection device, comprises an ingress and egress point for its corresponding network segment; and computer program code for mapping a SAN message along the identified intersegment path, wherein mapping the SAN message includes computer code for discovering respective manageable SAN entities in the first network segment and the second network segment wherein discovering manageable SAN entities includes:

computer program code for traversing through the first network segment and the second network segment via the intersegment connection device;

computer program code for identifying manageable SAN entities found during the traversal;

computer program code for determining a respective transport mechanism used by each of the identified manageable SAN entities;

computer program code for computing groups of discovered manageable SAN entities employing particular transport mechanisms; and computer program code for entering the computed groups as respective network segments in a model depicting a SAN environment, the SAN environment modeled via a SAN management application, the SAN management application operable for concurrently monitoring and accessing a first manageable SAN entity in the first network segment and a second manageable SAN entity in the second network segment;

wherein the computer program code for monitoring and accessing the first manageable SAN entity in the first network segment and a second manageable SAN entity in the second network segment includes:

computer program code for instantiating a third manageable SAN entity in the first network segment via the SAN management application;

computer program code for establishing a connection between the third manageable SAN entity and the first manageable SAN entity in the first network segment; and computer program code for executing an upgrade to the second manageable SAN entity in the second network segment.

15. The method as in claim 1, further comprising:

defining the physical interconnection employing a common transport mechanism as one of: Internet Small Computer Systems Interface (ISCSI), Logical SAN (LSAN), and Virtual SAN (VSAN).

16. The method as in claim 1, wherein mapping a SAN message further comprises converting the protocol of the SAN messages sent between the other manageable SAN entity and the at least one of the manageable SAN entities in the network segment to translate from an initiator format to a receiver format.

17. The method of claim 1 wherein said intersegment connection device is capable of mapping from a respective address space of a particular network segment to other connected network segments.

18. The method of claim 2 wherein said intersegment connection device is capable of mapping from a respective address space of a particular network segment to other connected network segments.

19. The SAN management device of claim 10 wherein said intersegment connection device is capable of mapping from a respective address space of a particular network segment to other connected network segments.

* * * * *